(12) United States Patent
McAlister

(10) Patent No.: US 8,046,820 B2
(45) Date of Patent: Oct. 25, 2011

(54) TRANSPORTING KEYS BETWEEN SECURITY PROTOCOLS

(75) Inventor: Donald McAlister, Apex, NC (US)

(73) Assignee: Certes Networks, Inc., Pittsburgh, PA (US)

( * ) Notice: Subject to any disclaimer, the term of this patent is extended or adjusted under 35 U.S.C. 154(b) by 899 days.

(21) Appl. No.: 11/541,387

(22) Filed: Sep. 29, 2006

(65) Prior Publication Data
US 2008/0104693 A1 May 1, 2008

(51) Int. Cl.
*H04L 29/06* (2006.01)

(52) U.S. Cl. .......................................... 726/1

(58) Field of Classification Search .......... 713/150–154; 726/10–15, 1; 380/277, 278, 279
See application file for complete search history.

(56) References Cited

U.S. PATENT DOCUMENTS

| | | | |
|---|---|---|---|
| 5,237,611 A | 8/1993 | Rasmussen et al. | |
| 5,577,209 A | 11/1996 | Boyle et al. | |
| 5,940,591 A | 8/1999 | Boyle et al. | |
| 6,035,405 A | 3/2000 | Gage et al. | |
| 6,061,600 A | 5/2000 | Ying | |
| 6,173,399 B1 | 1/2001 | Gilbrech | |
| 6,275,859 B1 | 8/2001 | Wesley et al. | |
| 6,330,562 B1 | 12/2001 | Boden et al. | |
| 6,484,257 B1 | 11/2002 | Ellis | |
| 6,556,547 B1 | 4/2003 | Srikanth et al. | |
| 6,591,150 B1 | 7/2003 | Shirota | |
| 6,658,114 B1 | 12/2003 | Farn et al. | |
| 6,697,857 B1 | 2/2004 | Dixon et al. | |
| 6,711,679 B1 | 3/2004 | Guski et al. | |
| 6,823,462 B1 | 11/2004 | Cheng et al. | |
| 6,915,437 B2 * | 7/2005 | Swander et al. | 713/151 |
| 6,920,559 B1 | 7/2005 | Nessett et al. | |
| 6,981,139 B2 | 12/2005 | Enokida | |
| 6,986,061 B1 * | 1/2006 | Kunzinger | 713/150 |
| 7,103,784 B1 | 9/2006 | Brown et al. | |
| 2002/0154782 A1 | 10/2002 | Chow et al. | |
| 2002/0162026 A1 | 10/2002 | Neuman et al. | |
| 2003/0135753 A1 | 7/2003 | Batra | |
| 2003/0191937 A1 | 10/2003 | Balissat et al. | |
| 2003/0233568 A1 * | 12/2003 | Maufer et al. | 713/200 |
| 2004/0005061 A1 | 1/2004 | Buer et al. | |
| 2004/0044891 A1 | 3/2004 | Hanzlik et al. | |

(Continued)

OTHER PUBLICATIONS

Zhang, Yongguang; A Multi-Layer IP Security Protocol for TCP Performance Enhancement in Wireless Networks; IEEE Journal on Selected Areas in Communications; Section III. The Principle of Multi-Layer security Protection; p. 4 http://home.att.net/~ygz/papers/jsac04.pdf.*

Serge-Paul Carrasco; Overlay network for security policies; Network World; Dec. 8, 2006; http://www.networkworld.com/news/tech/2006/121106techupdate.html?page=1.*

(Continued)

*Primary Examiner* — Ellen Tran
(74) *Attorney, Agent, or Firm* — Hamilton, Brook, Smith & Reynolds, P.C.

(57) ABSTRACT

A method for providing network security comprising a step of configuring a remote network to engage network security negotiation with a local network. The method includes a step of configuring a first security policy of a security component within the local network to pass through a network security negotiating communication between the local network and the remote network, and a step of establishing a network security negotiation between the remote network and a security parameter generator via the security component. The security parameter generator can be located within the local network and configured to provide secure communication with the remote network.

17 Claims, 2 Drawing Sheets

U.S. PATENT DOCUMENTS

| | | | |
|---|---|---|---|
| 2004/0062399 A1 | 4/2004 | Takase | |
| 2004/0117657 A1* | 6/2004 | Gabor et al. | 713/201 |
| 2004/0160903 A1 | 8/2004 | Gai et al. | |
| 2004/0225895 A1* | 11/2004 | Mukherjee et al. | 713/201 |
| 2004/0268124 A1 | 12/2004 | Narayanan | |
| 2005/0010765 A1 | 1/2005 | Swander et al. | |
| 2005/0066159 A1 | 3/2005 | Poussa et al. | |
| 2005/0125684 A1 | 6/2005 | Schmidt | |
| 2005/0138369 A1 | 6/2005 | Lebovitz et al. | |
| 2005/0149732 A1 | 7/2005 | Freeman et al. | |
| 2005/0182958 A1* | 8/2005 | Pham et al. | 713/200 |
| 2005/0190758 A1 | 9/2005 | Gai et al. | |
| 2005/0213574 A1* | 9/2005 | Yoshimura et al. | 370/389 |
| 2005/0223111 A1* | 10/2005 | Bhandaru et al. | 709/236 |
| 2006/0039364 A1* | 2/2006 | Wright | 370/352 |
| 2006/0072748 A1 | 4/2006 | Buer | |
| 2006/0072762 A1 | 4/2006 | Buer | |
| 2008/0127327 A1* | 5/2008 | Carrasco | 726/15 |

OTHER PUBLICATIONS

Tipton, Harold F. Drause, Micki; Information Security Management Handbook; 6th Edition; vol. 2; 2008; Chapter 14; p. 194; http://books.google.com/books?id=EqpjYH_Z6MQC&printsec=frontcover&source=gbs_v2_summary_r&cad=0#v=onepage&q=&f=false.*

IPsec Security Policy IKE Action MIB; Section 7.3; Baer et al; IPSP; Oct. 19, 2006 http://tools.ietf.org/html/draft-ietf-ipsp-ikeaction-mib-02.*

White Paper; CipherOptics; A Comparison with IETF's MSec and Cisco's DMVPN; 2006 http://www.infosec.co.uk/ExhibitorLibrary/520/wp-ce_vs_dmvpn_20.pdf.*

Frankel, S. "Demystifying the IPsec Puzzle," *Artech House*, Ch. 5, pp. 87-127 (2001).

Frankel, S. "Demystifying the IPsec Puzzle," *Artech House*, Ch. 9, pp. 179-205 (2001).

* cited by examiner

TRANSPORTING KEYS BETWEEN SECURITY PROTOCOLS

BACKGROUND OF THE INVENTION

Computer network traffic is normally sent unsecured without encryption or strong authentication by a sender and a receiver. This allows the traffic to be intercepted, inspected, modified or redirected. Either the sender or the receiver can falsify their identity. In order to allow private traffic to be sent in a secure manner, a number of security schemes have been proposed and are in use. Some are application dependent, as with a specific program performing password authentication. Others such as (TLS) are designed to provide comprehensive security to whole classes of traffic such as Hypertext Transfer Protocol (HTTP) (i.e., web pages) and File Transfer Protocol (FTP), i.e., files.

Internet Security (IPsec) was developed to address a broader security need. (See *Demystifying the IPsec Puzzle*, Frankel, S., Artech House (2001)) As the majority of network traffic today is over Internet Protocol (IP), IPsec was designed to provide encryption and authentication services to this type of traffic regardless of the application or the transport protocol. This is done in IPsec tunnel mode by encrypting a data packet (if encryption is required), performing a secure hash (authentication) on the packet, then wrapping the resulting packet in a new IP packet indicating it has been secured using IPsec.

Normally, the shared keys used by IPSec are established one of the two ways: manually or using the Internet Key Exchange (IKE) protocol. In load-balanced or highly redundant networks where traffic can be sent and/or received through multiple paths, there are no single pairs of Policy Enforcement Points (PEP) that can perform negotiation or be selected as the source or destination in the tunnel head as required by IKE. As such, in highly complex mesh networks, for example, where there are a number of networks and endpoints, the number of the policy required on each PEP becomes extremely large and management become more difficult with increasing scale as the number of networks increase.

Therefore, some networks implemented data protection managing technologies to resolve these problems while maintaining the existing IKE/IPSec gateway functionality. An example of this is disclosed in U.S. Provisional Application No. 60/813,766 filed on Jun. 14, 2006, the entire teachings of which are hereby incorporated by reference. Such a data protection managing technology separates policy management, key generation and distribution from policy enforcement and handles extremely large number of network. This works either for multiple paths in a redundant network or for many networks in a multicast scenario. In addition, the data protection managing technology greatly simplifies policy generation by grouping networks and Policy Enforcement Points (PEPs).

Despite the advantages of data protection, and improved management of key generation and distribution, there are a number of situations where a user may need to interface with a standard IKE device for use in the secure network. In addition to supporting legacy devices, this may be needed to detect Network Address Translation (NAT) between a remote client and a gateway of the secure network. Also, it could be useful in applying IKE for authentication.

Standard IKE, however, is insufficient for distributing keys to multiple PEPs units. IKE works only with point to point connections, with keys installed on each endpoint. Furthermore, standard key distribution using data protection managers does not suffice because it does not provide an interface to standard IKE systems and cannot detect NAT devices.

Therefore, there is a need for a network security technique for creating a secure tunnel between a local network equipped with data protection managing technologies and a remote standard device so that encrypted packets can be exchanged without comprising network security.

SUMMARY OF INVENTION

IN preferred embodiments, the invention is directed to a method for providing network security comprising a step of configuring a remote network to engage network security negotiation with a local network. The method further includes a step of configuring a first security policy of a security component within the local network to pass through a network security negotiating communication between the local network and the remote network, and a step of establishing a network security negotiation between the remote network and a security parameter generator via the security component. The security parameter generator can be located within the local network and configured to provide secure communication with the remote network. In a first preferred embodiment, the method can further include a step of establishing a secure association between the remote network and the local network. The step of establishing a secure association between the remote network and the local network can include one or more authentication mechanisms.

Another embodiment of the invention is an apparatus for providing network security comprising a remote network configured to engage network security negotiation with a local network. The apparatus further includes a security component within the local network with a security policy that can pass through a network security negotiating communication from the remote network, and a security parameter generator configured to provide a secure communication with the remote network via the security component. The security component can be located within the local network.

This invention is unique because it allows a IPsec tunnel traffic to a local PEP(s), where the traffic is not addressed to the PEP by the use of an IKE device located behind the PEP(s), and by the secure transmission of policies and keys to the PEP(s) after IKE negotiation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
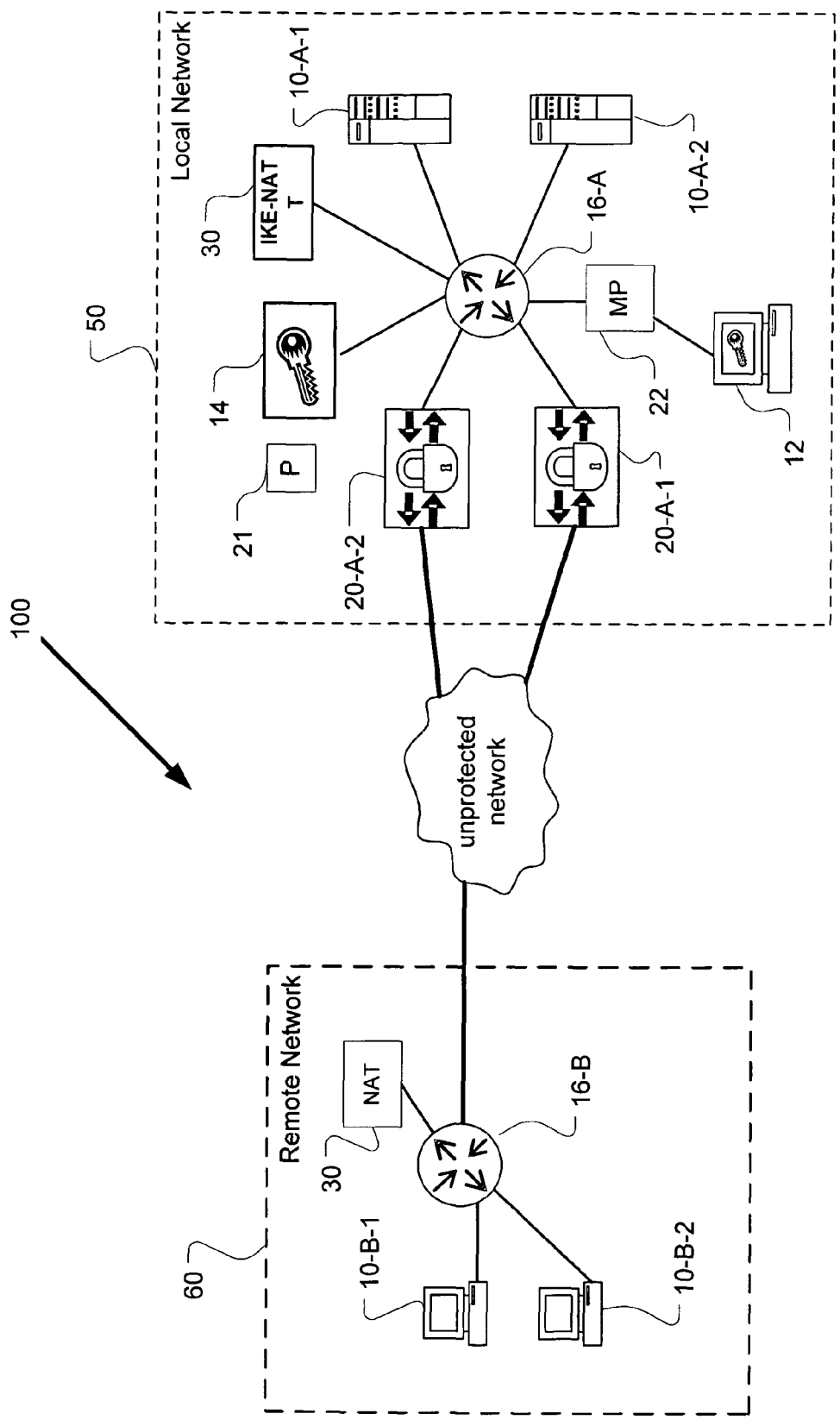
FIG. 1 is a system level diagram of an IKE negotiation scenario between a local network interfacing with a standard IKE device in a remote network.

For purposes of explaining aspects of various embodiments of the present invention, the following terms are defined and used herein:

"Securing" implies both encrypting data in transit and authenticating that data to ensure that the data has not been manipulated in transit.

A "secure tunnel" between two devices ensures that data passing between the two devices is secured.

A "security policy" (or simply "policy") for a secure tunnel defines data (or "traffic") to be secured by a source IP address, a destination IP address, a port number and/or a protocol. The security policy also defines a type of security to be performed.

A "key" for a secure tunnel is a secret information used to encrypt or to decrypt (or to authenticate and to verify) data in one direction of traffic in the secure tunnel. The "policies" for a secure tunnel define the traffic to be secured by source and destination IP address, port, and/or protocol. They also define the type of security to be performed.

A "security association" (SA) consists of all the information needed to characterize and exchange protected communications. Each SA includes various pieces of information that the IPsec procession routines can use to determine whether the SA is eligible to be applied to a particular inbound or outbound message. Each such item can have a specific value or values, to narrowly define those messages to which the SA applies; or a wildcard value, to indicate that an item is not relevant in evaluating traffic for the SA.

A "security group" (SG) is a collection of member end-nodes or subnets which are permitted to access or otherwise communicate with one another. A security policy may be configured with a security group and end nodes associated with that group. Further details of a preferred embodiment for configuring and distributing a security policy with a security group are contained in a U.S. Provisional Patent Application No. 60/836,173 entitled MULTIPLE SECURITY GROUPS WITH COMMON KEYS ON DISTRIBUTED NETWORKS, filed Aug. 8, 2006, assigned to CipherOptics, Inc., and which is hereby incorporated by reference in its entirety.

A security manager (SM) is a data processing device, typically a PC or a workstation, through which an administrative user can input and configure security policies 20. The SM 12 also acts as a secure server to store and provide access to such policies by other elements of the system.

A "Policy Enforcement Point" (PEP) is a software module that executes in a Security Gateway (SGW) on the data path that performs packet encryption and decryption as well as IPsec header generation on packets requiring security. It also passes or drops packets, and may be configured to perform additional functionality such as Static NAT or fragmentation. It is typically configured with security policies and SAs with security parameters indices (SPIs), and keys for encrypting and decrypting inbound and outbound packets a device that secures the data based on the policy.

A "Key Authorization Point" (KAP) is a module that creates the keys for some portion of security for a given tunnel. In IKE, this is done in coordination with a single peer as each side agrees on outbound and inbound keys. This might also be a single unit generating keys for traffic between a number of units. Or it may be a single SGW generating a key for outbound traffic on a given tunnel. This module also insures that all connections to a tunnel between SGWs have keys necessary to encrypt and decrypt data between the endpoints. In IKE, this is done as part of the phase 2 key exchange between two peers. It could also be a unit sharing its keys with another unit, or a device sharing keys with a group of SGW units. Note that the key distribution must be securely protected to prevent eavesdropping, tampering and to assure that the key exchange is with an authorized party, either through IKE Phase 1 (as in standard IKE) or with an established IKE tunnel passing the keys under Phase 2 as with normally encrypted traffic. One skilled the art will readily recognize the key distribution can be secured through other means. For example, the key distribution may be secured through TLS.

A description of preferred embodiments of the invention follows.

FIG. 1 illustrates an example wide area data communications network 100 implementing an embodiment of the present invention. In the network 100, Local network 50 generally includes a number of data processors and data processing functions including end nodes 10 (i.e. 10-A-1), Security Manager (SM) 12, a KAP 14, an inter-networking devices 16-A (such as a router or a switch), and one or more PEPs 20-A-1 and 20-A-2.

Typically, the network 100 has at least one other location, Remote Network 60. Remote Network 60 also includes end nodes 10 (i.e. 10-B-1), an inter-networking devices 16-B (such as a router or a switch). A standard IKE stack (not shown) resides, for example, on the end nodes 10-B-1 and 10-B-2. Remote Network 60 can further include IP-masquerading devices such as network address translation 30.

The end notes 10-A-1, 110-A-2, 10-B-1, 10-B-2 . . . (collectively, end nodes 10) in Remote Network 60 and Local Network 50 may be typically client computers, such as Personal Computers (PCs), workstations, Personal Digital Assistants (PDAs), digital mobile telephones, wireless network-enabled devices and the like. Additionally, the end nodes 10 may be also be file servers, video set top boxes, other data processing machines, or any other device capable of being networked from which messages are originated and to which messages are destines.

Messages (or traffic) sent to and from the end nodes 10 typically take the form of data packets in the well known Internet Protocol (IP) packet format. As is well known in the art, an IP packet may encapsulate other networking protocols such as the Transmission Control Protocol (TCP), the user Datagram Protocol (UDP), or other lower and higher level networking protocols.

As addressed earlier, in contrast to networks implementing data protection managing technologies that can work either for multiple paths in a redundant network or for many networks in a multicast scenario, an end node with standard IKE stacks located in Remote Network 60 is insufficient for distributing keys to multiple PEP 20 units. The system implemented in a standard IKE stack is a point-to-point connection with keys installed on each point. The end node 110-B-1, for example, is not configured to copy the inner address to the outer header of an IP address. For the same reason, Remote Network 60 cannot support multicast traffic.

The embodiment shown in FIG. 1 solves this problem associated with standard IKE stacks by extending the concept of IKE to allow distribution of keys and policies to multiple devices using the distributed key protocol, thereby providing an interface between the local network with data protection managing technologies and the remote IKE stack. A single device in Local Network 50 using IKE can provide the IKE interface to the end nodes 10-B-1 and 10-B-2.

As well known in the art, IKE is done in two phases. In a first phase (IKE Phase 1), a connection between Local Network 50 and Remote Network 60 is started in the clear. Using public key cryptographic mechanisms, where two parties can agree on a secret key by exchanging public data without a third party being able to determine the key, each party can determine a secret for use in the negotiation. Public key cryptography requires each party either share secret information (pre-shared key) or exchange public keys for which they retain a private, matching, key. This is normally done with certificates (Public Key Infrastructure or PKI). Either of these methods authenticates the identity of the peer to some degree.

Once a secret has been agreed upon in IKE Phase 1, a second phase (IKE Phase 2) can begin where the specific secret and cryptographic parameters of a specific tunnel are developed. All traffic in phase 2 negotiations are encrypted by the secret from phase 1. When these negotiations are complete, a set of secrets and parameters for security have been agreed upon by the two parties and IPsec secured traffic can commence.

Referring to FIG. 1, when the policies are deployed, the SM 12 sends meta-policies 22 to a KAP 14. The meta-policies contain all the information regarding each policy that was defined in the SM. This information includes the types of policies for handling received traffic: clear, drop, or IPsec; the KAP 14 required for each policy; and the PEPs 20-A-1, 20-A-2 that will require the policies and keys. This information can be defined by using an SM user interface.

For any transfer of data between two PEPs where one PEP passes encrypted data over an unsecured network to anther PEP, both PEPs must share a key. One PEP uses the shared key to encrypt the data for transmission over the unsecured network, while the second PEP uses the key shared with the first PEP to decrypt the data.

Figure 2:
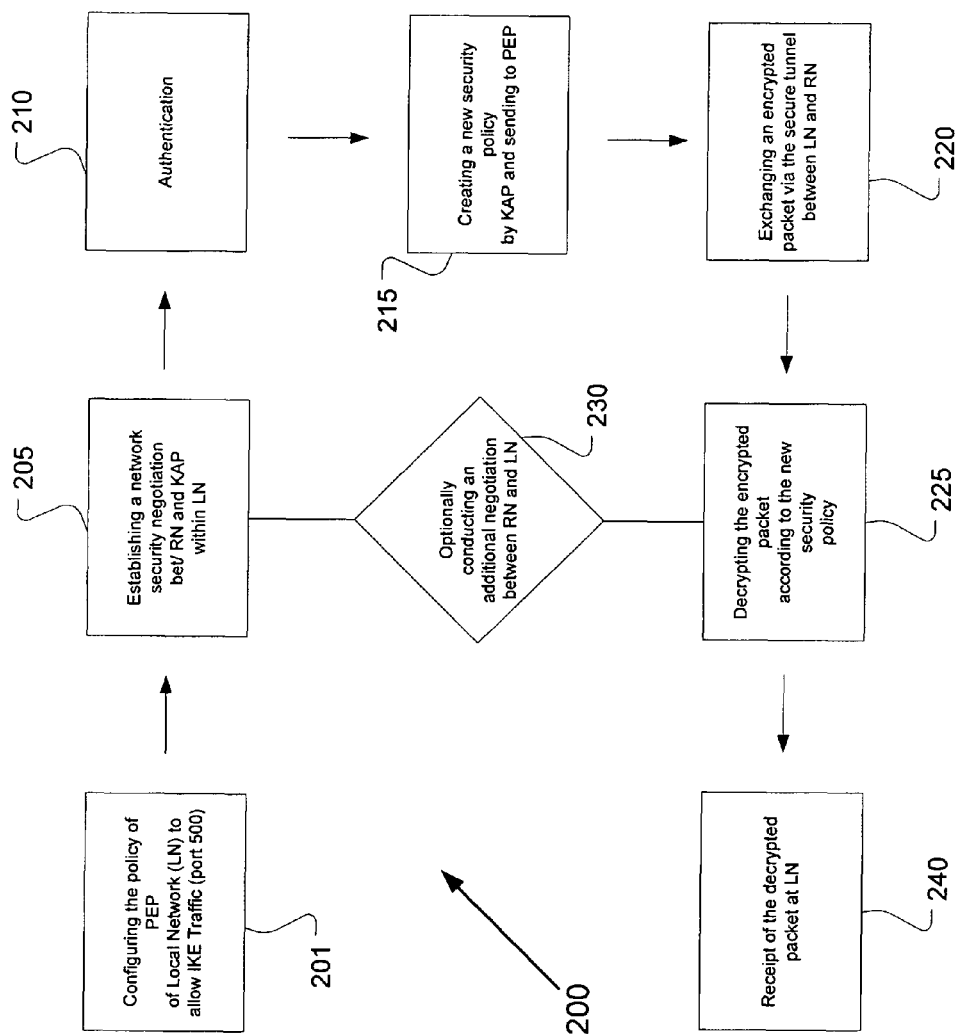
FIG. 2 is a flow chart of the steps performed in connection with the IKE negotiation scenario of FIG. 1.

FIG. 2 illustrates an example process 200 for the steps performed in connection with the IKE negotiation scenario in accordance with one embodiment. In step 201, the policy of the PEPs 20-A-1, 20-A-2 is configured to allow IKE traffic (UDP port 500) to pass through the KAP 14. Step 205 establishes a network security negotiation such as IKE between KAP 14 of Local Network 50 and IKE stack in Remote Network 60. In continuing the network security negotiation, the process 200 uses standard mechanisms such as certificates, preshared keys, nonce, Kerberos token, hash/notification, and signatures as indicated in step 210. Next, in step 215, the KAP 14 creates a new policy. This policy is deployed to the PEPs 20-A-a, 20-A-2, including local and remote IP addresses or ranges for the encrypted traffic, remote tunnel IP address, selector sections, policy settings, encryption and authentication keys and the SPI, and expiration time.

Referring to both FIG. 1 and FIG. 2, once a security tunnel is created between Remote Network 60 and Local Network 50, traffic can proceed from Remote Network 50 through any of the protecting PEPs 20-A-1, 20-A-2 and encrypted packet is exchanged as in step 220. In step 225, the encrypted packet is decrypted according to the new policy upon receipt of the packet. Although the packet is address to the KAP 14, the new policy at the PEPs strips the outer header during the decryption so that the packet would not be directed to the KAP 14. In step 240, the decrypted packet originated from Remote Network 60 is sent to an appropriate end node located in Local Network 50. In step 230, Remote Network 60 and Local Network 50 optionally renegotiate IPSec SAs. The process 200 periodically repeats the steps 205, 210, 215, 220 and 225.

If Remote Network 60 is equipped with located behind a Network Address Translator 30 (NAT), Local Network 50 can be standard IPsec NAT Traversal 16 (IKE NAT-T). Although NATs help concerve the remaining IP address space, they also introduce problems for end-to-end protocols such as IPsec. With IPsec NAT-T 16, Local Network 50 is capable during the IPsec negotiation process automatically to determine:

Whether both Remote Network 60, the initiating IPsec peer, and Local Network 50, the responding IPsec peer, can perform IPsec NAT-T 16; and If there are any NATs in the path between them.

If both of these conditions are true, both Local Network 50 and Remote Network 60 automatically use IPsec NAT-T 16 to send IPsec-protected traffic across NAT 30. If either peer does not support IPsec NAT-T 16, then normal IPsec negotiations (beyond the first two messages) and IPsec protection is performed. If both Remote Network 60 and Local Network 50 support IPsec NAT-T 16 and there are no NATs between them, normal IPsec protection is performed.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for providing network security given a remote network of a plurality of devices configured to engage in network security negotiation with a local network, the method comprising:

by a key authorization point (KAP) located within the local network:

exchanging network security negotiating communications with each of the plurality of devices to establish a network security negotiation between each of the plurality of devices and the KAP;

creating a respective security policy in response to each network security negotiation established by the KAP; and for each of the plurality of devices, deploying the respective security policy to a policy enforcement point (PEP) located within the local network and in a path between the KAP and each of the plurality of devices and to other PEPs located within the local network, so that each of the PEPs passes security negotiating communications being exchanged between the KAP and the plurality of devices, and encrypts and decrypts communications between the plurality of devices and the local network according to the deployed security policies.

2. The method of claim 1, wherein the remote network includes a legacy device.

3. The method of claim 1, wherein the step of exchanging network security negotiating communications to establish a security negotiation between each of the plurality of devices and the KAP includes negotiating a secure association between each of the plurality of devices and the KAP;

wherein the secure association is negotiated by the KAP exchanging the network security negotiating communication with each of the plurality of devices; and wherein the security negotiating communication being exchanged is passed through the PEP.

4. The method of claim 1, wherein the step of exchanging network security negotiating communications to establish a security negotiation between each of the plurality of devices and the KAP-includes performing an Internet Key Exchange (IKE) negotiation between the KAP and each of the plurality of devices;

wherein the IKE negotiation is performed by the KAP exchanging user datagram protocol (UDP) messages with each of the plurality of devices, the (UDP) messages having source and destination UDP ports set to 500; and wherein the (UDP) messages being exchanged are passed through the PEP.

5. The method of claim 3, wherein the step of negotiating the secure association between each of the plurality of devices and the KAP includes one or more authentication mechanisms.

6. The method of claim 5, wherein the authentication mechanisms include one or more of the following mechanisms: pre-shared keys exchange, certification, nonce, Kerberos token, hash/notification, and signature.

7. The method of claim 1, wherein the respective security policy defines traffic to be secured by any one of: local remote IP addresses or ranges for an encrypted traffic from the remote network, remote tunnel IP address, selector settings, security policy setting, encryption, authentication keys, security parameter index and tunnel termination.

8. The method of claim 1 further include the following steps:
   i) establishing a secure tunnel for exchanging an encrypted packet between the local network and each of the plurality of devices;
   ii) decrypting the encrypted packet according to the respective security policy; and
   iii) optionally conducting an additional security negotiation between each of the plurality of devices and the KAP via the PEP.

9. The method of claim 8, wherein the step of decrypting the encrypted packet according to the respective security policy includes stripping an IP (internet protocol) header of the encrypted packet to route the encrypted packet to a device within the local network.

10. A system for providing network security given a remote network of a plurality of devices configured to engage in network security negotiation with a local network, the system comprising:
   a policy enforcement point (PEP) located within the local network configured to pass security negotiating communications from the plurality of devices, and to encrypt and decrypt communications between the plurality of devices and the local network according to security policies, and
   a key authorization point (KAP) configured to:
   i) exchange network security negotiating communications with each of the plurality of devices to establish a network security negotiation between each of the plurality of devices and the KAP;
   ii) create a respective security policy in response to each network security negotiation established by the KAP, and
   iii) deploy the respective security policy to the PEP in a path between the KAP and each of the plurality of devices and to other PEPs located within the local network, so that each of the PEPs encrypts and decrypts communications between the plurality of devices and the local network according to the respective security policy.

11. The network security system of claim 10, wherein the remote network includes a legacy device.

12. The network security system of claim 10, wherein the KAP is configured to perform an Internet Key Exchange (IKE) negotiation with each of the plurality of devices; and
   wherein the IKE negotiation is performed by the KAP exchanging user datagram protocol (UDP) messages with each of the plurality of devices, the (UDP) messages having source and destination UDP ports set to 500; and
   wherein the (UDP) messages being exchanged are passed through the PEP.

13. The network security system of claim 10 wherein the KAP is configured to negotiate a secure association between each of the plurality of devices and the KAP; and
   wherein the secure association is negotiated by the KAP exchanging the network security negotiating communication with each of the plurality of devices; and
   wherein the security negotiating communication being exchanged is passed through the PEP.

14. The network security system of claim 13, wherein negotiating the secure association between each of the plurality of devices and the local network includes one or more authentication mechanisms.

15. The network security system of claim 14, wherein the authentication mechanisms include one or more of the following mechanisms: pre-shared keys exchange, certification, nonce, Kerberos token, hash/notification, and signature.

16. The network security system of claim 10, wherein the respective security policy defines traffic to be secured by any one of the following security parameters: local remote IP addresses or ranges for an encrypted traffic from the remote network, remote tunnel IP address, selector settings, security policy setting, encryption, authentication keys, security parameter index and tunnel termination.

17. The network security system of claim 10, wherein the PEP is configured to:
   i) establish a secure tunnel for exchanging an encrypted packet between the local network and each of the plurality of devices;
   ii) decrypt the encrypted packet according to the respective security policy; and
   iii) optionally conduct an additional security negotiation between each of the plurality of devices and the KAP via the PEP.

* * * * *